Dec. 31, 1929.   C. G. RICHARDSON   1,742,170
PERCH CLOCK
Filed April 27, 1923   3 Sheets-Sheet 1
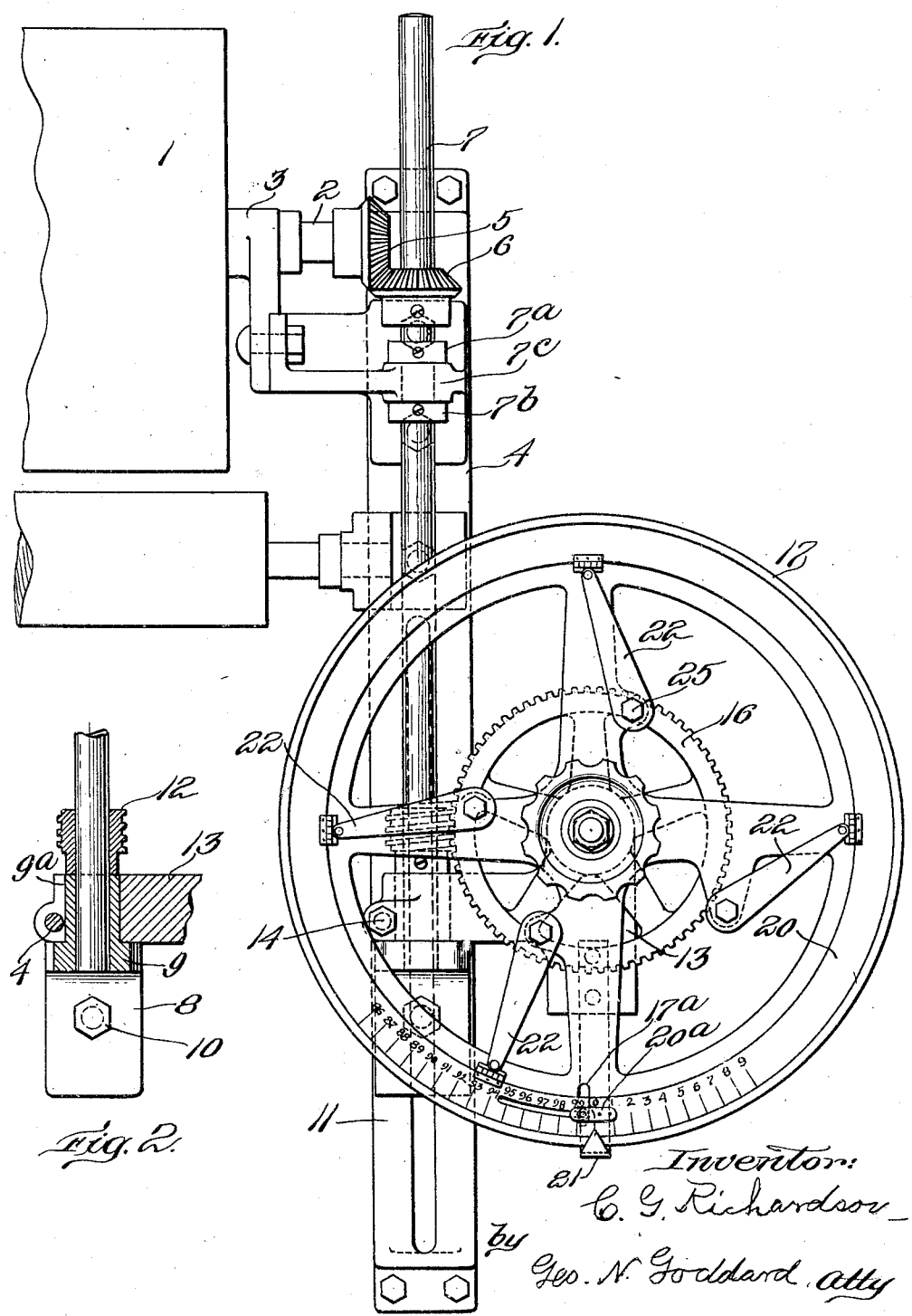

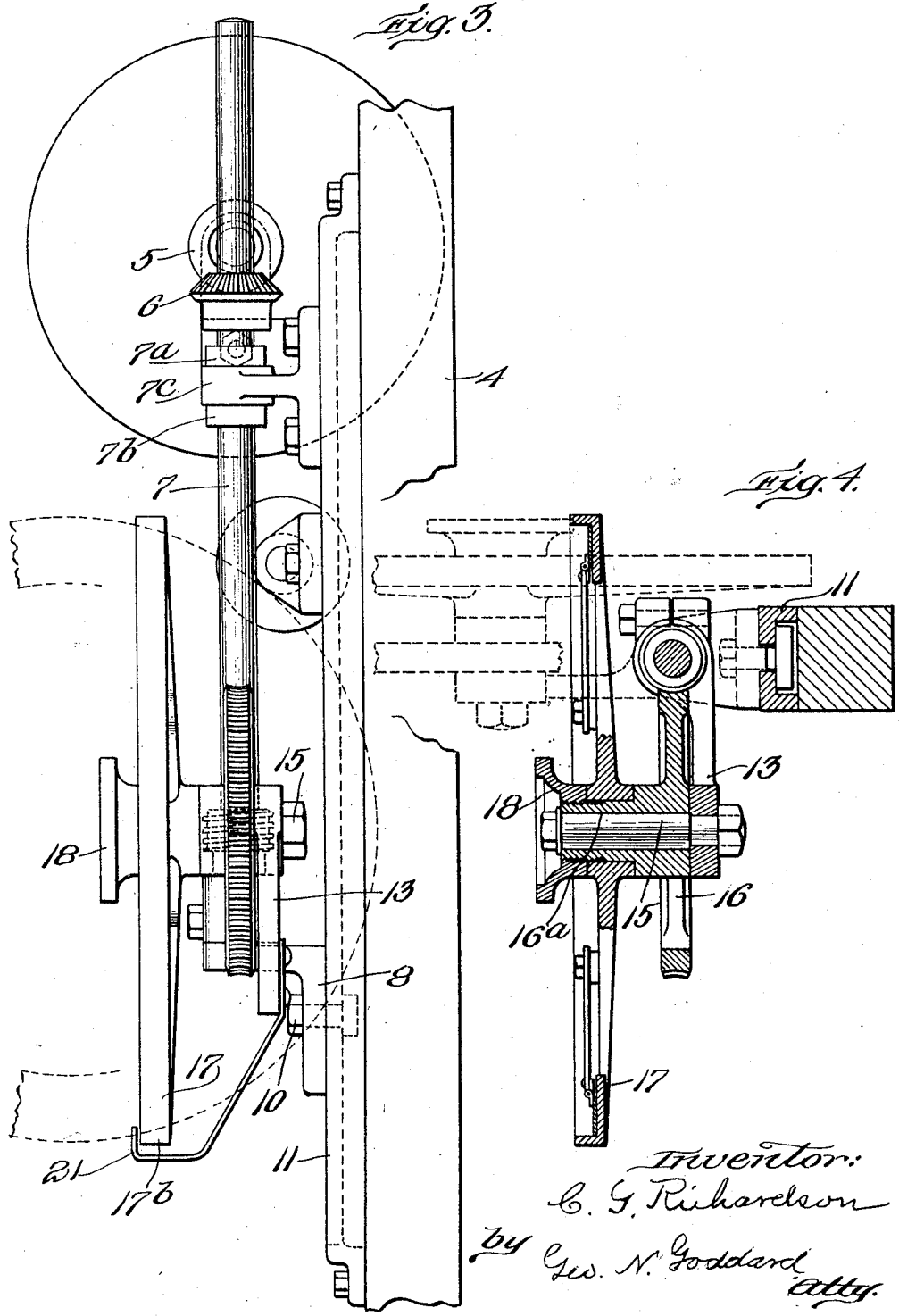

Dec. 31, 1929.　　　C. G. RICHARDSON　　　1,742,170
PERCH CLOCK
Filed April 27, 1923　　　3 Sheets-Sheet 3
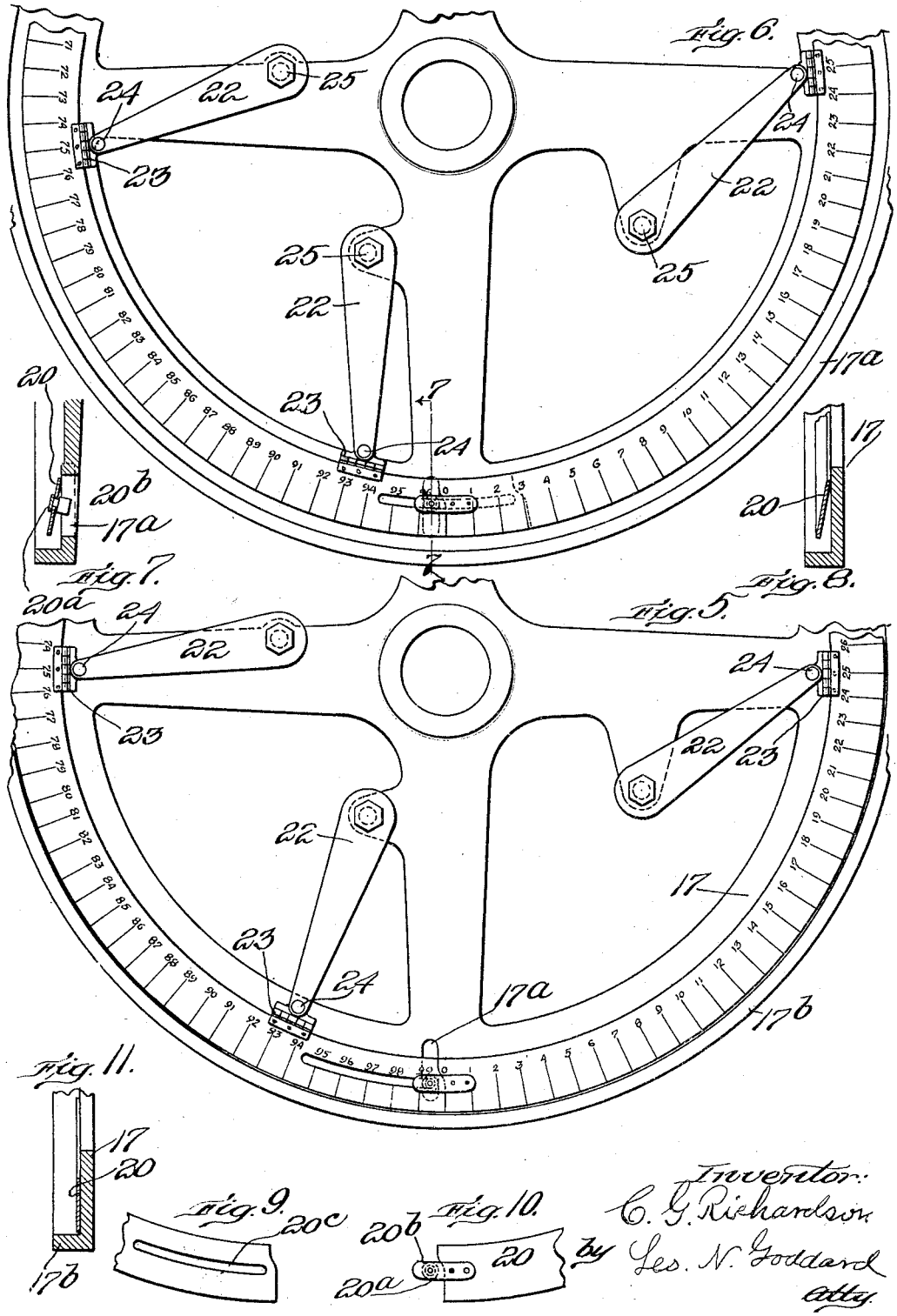

Patented Dec. 31, 1929

1,742,170

UNITED STATES PATENT OFFICE

CHARLES G. RICHARDSON, OF SPRINGFIELD, VERMONT, ASSIGNOR TO PARKS & WOOLSON MACHINE COMPANY, OF SPRINGFIELD, VERMONT, A CORPORATION OF VERMONT

PERCH CLOCK

Application filed April 27, 1923. Serial No. 634,959.

This invention relates to perch clocks such as are used for simultaneously inspecting and measuring pieces of cloth. In Letters Patent of the United States No. 1,432,622, dated Oct. 17, 1922, I disclosed a construction and arrangement for a measuring dial capable of adjustment to different levels to suit the height of the percher, the dial itself having its measuring scale visible peripherally on a cylindrical band and thus presenting to view only a small arc of the whole scale to be readable at any given time. The present invention is intended to provide a measuring dial whose entire scale is always visible to the percher and can be set and adjusted to give it the angular position and height most favorable to visibility or easy reading under varying conditions of the incidence of light and of the percher's position while inspecting the cloth, it being highly desirable that the dial shall be so easily readable as not to interfere with the inspection of the cloth. It is also desirable that the measuring dial itself shall be capable of easy adjustment to compensate for variations in stretch, thickness and slip of different kinds of fabric that may require measurement.

To this end the invention embraces a construction of dial wheel having a lateral as distinguished from a peripheral scale face, that is, having a substantially flat or radial annular scale face that lies in a plane transverse to the axis of the wheel or coincident with the plane of revolution of the dial and so constructed and mounted as to permit expansion and contraction of the dial. Another feature characterizing the invention is the combination with the dial actuating means and a dial wheel mounted to permit angular adjustment of the dial face to the plane of the cloth exposed to inspection in order to minimize the distraction of the attention of the percher from the cloth in order to read the dial.

These and other features of the invention will be explained in the following specification and will be defined in the claims hereto annexed.

In the accompanying drawings I have illustrated a preferred form of construction embodying the principles of this invention, in which:

Figure 1 is a front elevation showing the dial mounted in operative relation to the cloth drum.

Figure 2 is a detail view showing in central section the swivel bearing for supporting the dial wheel.

Figure 3 is a side elevation at right angles to the plane of Figure 1.

Figure 4 is a horizontal section through the center of the dial wheel and its support.

Figure 5 is an enlarged view of a portion of the dial as viewed readily with the dial uncontracted.

Figure 6 is a similar view showing the dial in somewhat contracted position of adjustment.

Figure 7 is a detail in radial section through the zero point of the rim portion of the dial wheel.

Figure 8 is a similar view on another transverse plane through the dial rim.

Figures 9 and 10 are detail views showing the telescoping ends of the dial rim or scale member.

Figure 11 is a transverse section through the rim portion of the dial wheel showing the dial rim, in uncontracted position.

In the accompanying drawings I have shown a construction and arrangement based on a revoluble dial wheel cooperating with a fixed pointer, and while that arrangement is preferable because it permits the reading of yardage to be made always at the same fixed point that may be located to best suit the percher, yet I do not limit myself to such arrangement.

In the practice of the invention as actually illustrated in the drawings, I have shown the revoluble cloth drum 1, over which the cloth is drawn for inspection having its shaft journal 2, mounted in a suitable bearing bracket 3 carried by an upright 4 of the supporting frame and having driving or actuating connection with a vertical dial-actuating shaft 7, through the medium of miter gears 5 and 6.

The dial-actuating shaft 7, is supported at its lower end in a bearing sleeve 9 formed on the vertically adjustable bracket 8 which may be clamped in any desired position of vertical adjustment by means of the clamping bolt 10 whose head is retained in a vertically slotted supporting plate 11 attached to the upright 4. The upper end of the shaft passes through an upper bearing 7ᶜ and is provided with upper and lower thrust collars 7ª, 7ᵇ, to keep it in fixed relation to said bearing at any desired level to which the dial wheel may be adjusted. The dial wheel itself is supported upon a central stud or arbor 15 which is bolted to a bracket or arm 13 whose inner end is bored and split to fit around and be clamped upon the sleeve portion 9ª of the supporting bearing box 9 which is integral with the adjustable bracket 8. A clamping bolt 14 serves to clamp the dial wheel supporting arm 13 in any desired angular relationship to the plane of the cloth exposed for inspection that hangs down in front of the cloth roll or drum.

On the fixed arbor 15 carried by the bracket 13 is rotatably mounted a worm gear 16 so as to intermesh with a worm 12 secured to the lower portion of the actuating shaft 7, just above its lower bearing. The outer end of the hub of the worm gear 16 is reduced to form a seat as shown at 16ª for receiving the hub of the spider 17 of the dial wheel. The dial wheel 17 is frictionally clamped in any desired position of adjustment on the sleeve 16ª of the worm gear hub by means of the internally threaded hand nut 18 so as to render easy the resetting of the wheel to the zero point for accurate measurement.

The dial member or ring itself is made in the form of a thin flat ring 20 on whose lateral face is marked a graduated yard scale running in this case, from zero to 100 so that the entire circle of the dial is always visible to the percher. The dial ring 20 is cut through or split at the zero point of the scale to render it expansible and contractible in order to make it possible to compensate for differences in accurate measurement due to variations in the stretch, the thickness and the smoothness of different kinds of fabric to be measured for which allowance must be made in order to ascertain correctly the yardage.

The zero end of the scale is anchored at a fixed point on the supporting spider 17 by means of a short clip or plate 20ª which is provided with an inwardly projecting pin 20ᵇ which passes through a radial slot 17ª in the supporting spider. The other end of the severed ring 20 is provided with a slot 20ᶜ extending in a circumferential direction so as to receive the pin 20ᵇ and allow the slotted end to underlap the anchored end of the dial ring so that by the telescoping of the slotted end in relation to the anchored end the circumferential length of the scale may be shortened or lengthened to compensate for the variations in the character of the fabric to be measured. The slot and pin connection forms a guide for preserving concentricity while the slot 17ª allows the anchoring pin to move inward as the dial ring is contracted.

In its normal or uncontracted position, that is, with its severed ends practically in registry for abutting, the dial ring will be in the form of a thin flat ring lying in the plane of its own revolution transverse to the axis of its revolution, but as the flat ring is contracted its outer edge must approach the center more rapidly than does its inner edge owing to the greater absolute diameter and hence, in order to permit the concentric contraction of the dial, I make provision for permitting it to buckle or dish into a slightly concave or frustro-conical form.

With this object in view I provide a plurality of eccentrically mounted dial-supporting arms 22 which have swiveled connection at their outer ends by means of a swivel connecting pin 24 with hinges or clips 23 attached to the inner edge portion of the dial ring. These supporting arms are carried on fulcral supporting bolts 25 mounted at appropriate points on the spider to permit them to swing sufficiently about their fulcral points to support the dial in its various positions of contraction while still preserving substantial concentricity of the ring in its different positions of adjustment. Ordinarily a contraction of 5 yards will more than compensate for any range of cloth variation to be taken care of by the machine. Testing by means of accurately measured lengths of cloth of different weaves will inform the operator just how much contraction of the dial should be made for any particular weave and weight of cloth.

Suppose for example, the scale be in normal uncontracted position and the previous testing has shown that a particular kind of cloth for accurate measurement requires a setting of the scale or dial for the 97 yard circuit. In that case the bolts 25 will be slacked or loosened and the free or slotted end of the scale will be telescoped under the zero end until the 97 yard mark registers with the zero mark. The bolts 25 should then be tightened to clamp the dial-supporting arms in such position and the device is then ready for measuring that class of fabric.

It will be observed that the fulcral bolts 25 supporting the dial arms 22 are offset at different distances from the direct radii passing through their outer ends and also are located at slightly different distances from the center of the dial, the object of this arrangement being to preserve substantial concentricity of the dial in its various positions of adjustment. It will be obvious that one complete revolution of the dial in its uncontracted position would indicate a measurement of 100 yards, while a complete revolution of the dial contracted as shown in Figure 6 would indicate a measurement of only 97 yards. In this way a complete compensatory adjustment can be very easily and conveniently effected.

As the position of the operator in inspecting the cloth will depend somewhat on the individual and somewhat upon the direction from which the light strikes the cloth, and as it is highly desirable that the reading of the dial should be so plain and easy as to require no substantial distraction of the attention of the percher away from the cloth, provision has been made for varying the angular adjustment of the dial to the plane of the cloth or to the axis of the cloth roll or drum by giving the supporting bracket 13 an angular adjustment on its supporting bracket as best illustrated in Figure 4 where the dial wheel is shown in full lines extending substantially parallel to the plane of the cloth or to the axis of the cloth roll while the dotted lines of said figure indicate the dial wheel turned into a plane at right angles to the plane of the cloth or the axis of the cloth roll. Usually, however, some position intermediate of these two positions shown will be found most convenient.

To set the dial wheel at different levels to accommodate perchers of different height the operator will slacken the thrust collars 7ª and 7ᵇ and also the miter gear 6 and then by raising or lowering the foot-step bearing bracket 8 will set the dial wheel at the desired elevation where it will be clamped in position by the clamping bolt 10 after which the thrust collars and gear will be again fixed to the shaft in their appropriate positions by means of their set screws as shown in Figure 1.

The uncontracted position of the dial or scale ring 20 is illustrated in Figure 11, while in Figures 7 and 8 the dial ring is shown in contracted position with its outer edge buckled or dished laterally to compensate for its shortened circumference.

I believe that I am the first to provide measuring apparatus of this type with a laterally displayed scale that is contractible and expansible for compensation purposes so that the entire scale can be viewed in an axial direction at all times, and I also believe that I am the first in this art to provide a flat measuring dial with an angular adjustment on its support so that it can be set at an angle most convenient to the percher according to the particular conditions obtaining in each case.

The compound joint at the outer end of each supporting arm which permits movement about an axis parallel with the axis of the dial wheel as well as movement about an axis at right angles thereto makes it possible to effect any necessary degree of contraction of the flat dial ring without appreciable departure from concentricity in all positions.

It will, of course, be understood that the dial ring must be made of sufficiently thin flexible material to permit the requisite buckling action above described when the dial is contracted.

What I claim is:

1. A dial wheel for a perch clock or the like, embracing in its construction a supporting spider, a contractible flat dial ring mounted thereon and having a laterally inscribed measuring scale and means for concentrically contracting said ring, substantially as described.

2. A dial wheel for a perch clock embracing in combination a supporting spider, and a normally flat dial ring relatively thin in an axial direction and wide in a radial direction provided with a measuring scale on one side face, said dial ring being mounted on said spider to permit adjustment of its circumferential length in order to compensate for differences in the character of the fabric to be measured, substantially as described.

3. A dial wheel for a perch clock embracing in combination a supporting spider, a dial member comprising a thin flat ring extending edgewise in the plane of its rotation and provided with a laterally disposed measuring scale, a series of supporting arms mounted eccentrically, on the spider and having pivotal connection at their outer ends with the dial ring said arms being adjustable to different angular positions in relation to the radii of the wheel in order to secure adjustment of the circumferential length of the measuring scale, substantially as described.

4. A dial wheel for a perch clock embracing in a combination a spider, an annular flat dial having a laterally inscribed measuring scale, a series of dial supporting arms adjustably mounted on the spider and having pivotal connection with the dial at their outer ends in order to permit adjustment of the circumferential length of the dial, substantially as described.

5. A dial wheel for a perch clock embracing in combination a supporting spider, an expansible and contractible dial ring provided with a laterally inscribed measuring scale, and means for adjustably supporting said dial ring on the spider to permit variation in the circumferential length of the scale, substantially as described.

6. A dial wheel for a perch clock embracing in combination a supporting spider, an expansible and contractible dial ring having a measuring scale inscribed on its exposed lateral face, means for supporting said dial adjustably on the spider to permit variation in the length of the circumferential scale, said means having flexible connection with the dial ring to permit the outer edge of the dial ring in contracting to approach the center a greater distance than does its inner edge, substantially as described.

7. A dial wheel for a perch clock embracing in combination a supporting spider, an expansible and contractible dial ring, means for adjustably supporting said dial ring on the spider to permit variation of the circumferential length of the dial ring, said supporting means having flexible connection with said dial through two angularly disposed pivotal axes to permit circumferential movement of the ring and also a lateral buckling of the ring, substantially as described.

8. In a dial wheel for a perch clock embracing in combination a supporting spider, an expansible and contractible dial ring, a plurality of dial supporting arms each adjustably secured to said spider and having at its outer ends pivotal connection with one member of a hinge the other member of which is secured to the dial in order to permit contraction of the circumferential length of the dial and permit the dial to assume a slightly frustro conical form, substantially as described.

9. In a dial wheel for a perch clock embracing in its construction a revoluble gear provided with an annular bearing seat for a spider, a circumferentially adjustable spider adjustably secured on said bearing seat and an expansible and contractible dial ring having a measuring scale inscribed on its exposed lateral face, substantially as described.

10. In a perch clock the combination of an actuating worm shaft rotated in coordination with the travel of the cloth being measured, a worm gear operatively connected with the worm of said shaft, a spider adjustably secured to said worm gear to be rotated thereby and a alterally inscribed measuring dial mounted on said spider, said dial supporting spider and worm gear being mounted to have angular adjustment about said worm shaft to cause the dial to face in different directions, substantially as described.

11. In a perch clock the combination with an actuating shaft, of a revoluble dial wheel having a flat laterally inscribed annular measuring scale, rotated by gearing connection with said shaft, and mounted to swing about said shaft to cause the dial to face in different directions without disturbing the driving connection with said shaft, said dial wheel being also adjustable as to height without disturbing said driving connection, substantially as described.

12. In a perch clock, the combination with a vertical actuating shaft rotated in coordination with the travel of cloth being measured, of a revoluble dial wheel having a flat laterally inscribed annular dial scale operatively connected with said shaft to be rotated thereby, said dial wheel being mounted to rotate about a horizontal axis that is angularly adjustable about said shaft to face different ways, substantially as described.

In witness whereof, I have subscribed the above specification.

CHARLES G. RICHARDSON.